United States Patent
Wiley

(10) Patent No.: US 8,309,711 B2
(45) Date of Patent: Nov. 13, 2012

(54) FILTRATION OF CORN STARCH FOLLOWED BY WASHING AND COLLECTION OF THE RESULTANT CORN STARCH CAKE

(75) Inventor: Nathan Wiley, Indianapolis, IN (US)

(73) Assignee: Corn Products Development Inc., Westchester, IL (US)

( * ) Notice: Subject to any disclaimer, the term of this patent is extended or adjusted under 35 U.S.C. 154(b) by 381 days.

(21) Appl. No.: 12/537,947

(22) Filed: Aug. 7, 2009

(65) Prior Publication Data

US 2011/0031192 A1 Feb. 10, 2011

(51) Int. Cl.
- *C08B 30/04* (2006.01)
- *B01D 37/00* (2006.01)
- *B01D 29/66* (2006.01)
- *B01D 29/78* (2006.01)
- *B01D 29/84* (2006.01)

(52) U.S. Cl. ........ 536/127; 536/102; 210/768; 210/769; 210/771; 210/772; 210/798; 210/248; 210/323.2; 210/333.01; 210/409; 210/410; 210/411

(58) Field of Classification Search .............. None
See application file for complete search history.

(56) References Cited

U.S. PATENT DOCUMENTS

| | | | | |
|---|---|---|---|---|
| 171,056 | A * | 12/1875 | Sinclaire | 210/285 |
| 955,836 | A * | 4/1910 | Moore | 210/772 |
| 2,083,578 | A * | 6/1937 | Roberts | 208/31 |
| 2,744,632 | A * | 5/1956 | Gardes | 210/184 |
| 2,780,363 | A * | 2/1957 | Pew | 210/794 |
| 2,845,368 | A * | 7/1958 | Fredrickson | 127/38 |
| 2,871,147 | A * | 1/1959 | Smith | 127/40 |

(Continued)

FOREIGN PATENT DOCUMENTS

DE 195 18 575 A1 11/1996

(Continued)

OTHER PUBLICATIONS

Avery, Larry "Filtration of Solids from Liquid Streams", Handbook of Powder Science—Technology, 2nd Ed. 1997, edited by Muhammed Fayed, p. 683-712.
European Search Report issued in European Patent Appln. No. 10170862.6 on Mar. 18, 2011.
BHS-Sonthofen, "BHS-Sonthofen—the experts in filtration, cake washing and drying operations", brochure, 10 pages, 2010.

(Continued)

*Primary Examiner* — Robert James Popovics
(74) *Attorney, Agent, or Firm* — Thomas C. McKenzie; Karen Kaiser

(57) ABSTRACT

The method of forming a filter cake from a slurry comprising the steps of feeding the slurry into a filter housing, wherein the filter housing includes a plurality of vertical filter elements; pressing the slurry into the filter housing against the filter elements resulting in i) a filtrate passing through the filter elements and exiting out an exhaust port of the filter housing; ii) forming a solid cake on the filter elements; feeding a wash liquid into the filter housing while draining out the slurry by opening the slurry drain valve; closing the slurry drain valve and then continually feeding wash liquid through the cake and into the filter tube of the filter housing; stopping the feed of wash liquid; introducing a gas into the filter housing and draining out the wash liquid by opening a bottom drain valve; stopping the gas flow and opening a drain to exit most of the gas and remaining wash liquid; opening the bottom cake discharge valve; and back pulsing by a gas to break and to release the filter cake from the filter elements of the filter housing.

5 Claims, 6 Drawing Sheets

U.S. PATENT DOCUMENTS

| | | | | |
|---|---|---|---|---|
| 2,890,138 A * | 6/1959 | Smith et al. | 127/48 |
| 2,929,748 A * | 3/1960 | Schwandt | 127/71 |
| 2,956,944 A * | 10/1960 | Logan et al. | 208/39 |
| 2,981,416 A * | 4/1961 | Lawlor | 210/333.1 |
| 3,003,894 A * | 10/1961 | Fredrickson | 127/71 |
| 3,042,214 A * | 7/1962 | Arvanitakis | 210/330 |
| 3,050,858 A * | 8/1962 | Giesse | 33/542 |
| 3,100,190 A * | 8/1963 | Hobson, Jr. | 210/106 |
| 3,117,233 A * | 1/1964 | Mittelberger et al. | 250/222.1 |
| 3,169,109 A * | 2/1965 | Hirs | 210/107 |
| 3,204,766 A * | 9/1965 | Schmidt, Jr. | 210/86 |
| 3,225,933 A * | 12/1965 | Berline | 210/333.01 |
| 3,267,649 A * | 8/1966 | Vicard | 55/286 |
| 3,280,978 A * | 10/1966 | Winfield | 210/794 |
| 3,280,980 A * | 10/1966 | King | 210/108 |
| 3,310,175 A * | 3/1967 | McLagan | 210/193 |
| 3,399,777 A * | 9/1968 | Passalaqua | 210/332 |
| 3,438,502 A * | 4/1969 | Borre et al. | 210/232 |
| 3,447,690 A * | 6/1969 | Kracklauer | 210/332 |
| 3,482,700 A * | 12/1969 | Bebech | 210/332 |
| 3,637,079 A * | 1/1972 | Strub | 210/794 |
| 3,744,633 A * | 7/1973 | Schmidt et al. | 210/785 |
| 3,796,316 A * | 3/1974 | Matz | 210/332 |
| 3,843,406 A * | 10/1974 | Wright et al. | 127/27 |
| 3,867,291 A * | 2/1975 | Schmidt et al. | 210/139 |
| 3,910,173 A * | 10/1975 | Zepponi | 99/277.1 |
| 3,984,320 A * | 10/1976 | Barefoot | 210/139 |
| 4,085,050 A * | 4/1978 | Gervasi | 210/332 |
| 4,089,781 A * | 5/1978 | Asp | 210/797 |
| 4,107,033 A * | 8/1978 | Holz | 209/17 |
| 4,120,911 A * | 10/1978 | Davidson | 62/541 |
| 4,153,552 A * | 5/1979 | Muther | 210/769 |
| 4,163,724 A * | 8/1979 | Muller et al. | 210/323.2 |
| 4,213,861 A * | 7/1980 | Muller et al. | 210/797 |
| 4,265,771 A * | 5/1981 | Lennartz et al. | 210/769 |
| 4,282,105 A * | 8/1981 | Crowe | 210/798 |
| 4,289,630 A * | 9/1981 | Schmidt et al. | 210/785 |
| 4,358,383 A * | 11/1982 | Asp | 210/771 |
| 4,404,370 A * | 9/1983 | Bernert et al. | 536/85 |
| 4,405,466 A * | 9/1983 | Giannelli et al. | 210/798 |
| 4,412,867 A * | 11/1983 | Cicuttini | 127/66 |
| 4,436,633 A * | 3/1984 | Robinsky et al. | 210/791 |
| 4,439,327 A * | 3/1984 | Muller | 210/772 |
| 4,446,030 A * | 5/1984 | Schmidt, Jr. | 210/805 |
| 4,502,171 A * | 3/1985 | Koskinen et al. | 5/156 |
| 4,514,129 A * | 4/1985 | Legille et al. | 414/200 |
| 4,517,086 A | 5/1985 | Romey et al. | |
| 4,522,717 A | 6/1985 | Brust | |
| 4,525,275 A * | 6/1985 | Ostlund | 210/323.2 |
| 4,526,688 A * | 7/1985 | Schmidt et al. | 210/323.2 |
| 4,528,103 A * | 7/1985 | Spilkin et al. | 210/791 |
| 4,552,669 A * | 11/1985 | Sekellick | 210/798 |
| 4,591,446 A * | 5/1986 | Muller | 210/797 |
| 4,592,847 A * | 6/1986 | Schumacher | 210/770 |
| 4,622,144 A * | 11/1986 | Janecek et al. | 210/351 |
| 4,714,557 A * | 12/1987 | Croket | 210/769 |
| 4,725,356 A | 2/1988 | Zievers et al. | |
| 4,738,786 A * | 4/1988 | Wykoff | 210/769 |
| 4,804,481 A * | 2/1989 | Lennartz | 210/791 |
| 4,830,747 A * | 5/1989 | Kubota et al. | 210/203 |
| 4,943,379 A * | 7/1990 | Boze et al. | 210/778 |
| 4,954,268 A * | 9/1990 | Just et al. | 210/772 |
| 4,963,271 A * | 10/1990 | Raehse et al. | 210/772 |
| 5,008,009 A * | 4/1991 | Ciaffoni | 210/193 |
| 5,017,241 A * | 5/1991 | Ryan | 134/22.12 |
| 5,062,965 A * | 11/1991 | Bernou et al. | 210/785 |
| 5,062,968 A * | 11/1991 | Warning | 210/771 |
| 5,085,997 A * | 2/1992 | Muller | 435/261 |
| 5,093,001 A * | 3/1992 | Ueda | 210/403 |
| 5,114,596 A * | 5/1992 | Laterra | 210/798 |
| 5,152,815 A * | 10/1992 | Zievers et al. | 55/341.1 |
| 5,160,428 A * | 11/1992 | Kuri | 210/107 |
| 5,160,442 A * | 11/1992 | Hampton et al. | 210/791 |
| 5,178,777 A * | 1/1993 | Ekberg et al. | 210/791 |
| 5,227,076 A * | 7/1993 | Bogen et al. | 210/791 |
| 5,244,585 A * | 9/1993 | Sugimoto | 210/798 |
| 5,346,629 A * | 9/1994 | Wuller | 210/739 |
| 5,389,244 A * | 2/1995 | Cranston | 210/106 |
| 5,391,299 A * | 2/1995 | Masuda et al. | 210/659 |
| 5,437,788 A * | 8/1995 | Geibel et al. | 210/333.01 |
| 5,470,473 A * | 11/1995 | Park et al. | 210/402 |
| 5,498,349 A * | 3/1996 | Kurahashi et al. | 210/798 |
| 5,540,846 A * | 7/1996 | Koch et al. | 210/741 |
| 5,589,079 A * | 12/1996 | Park et al. | 210/784 |
| 5,628,916 A * | 5/1997 | Stevens et al. | 210/798 |
| 5,667,683 A * | 9/1997 | Benian | 210/409 |
| 5,759,397 A * | 6/1998 | Larsson et al. | 210/331 |
| 5,851,391 A * | 12/1998 | Ozawa | 210/350 |
| 5,925,258 A * | 7/1999 | Pryor et al. | 210/770 |
| 5,945,006 A * | 8/1999 | Mignani | 210/797 |
| 5,972,228 A * | 10/1999 | Ingelman et al. | 210/771 |
| 5,997,652 A * | 12/1999 | Potter et al. | 127/9 |
| 6,004,465 A * | 12/1999 | Uhr et al. | 210/651 |
| 6,113,778 A * | 9/2000 | Kemp et al. | 210/85 |
| 6,251,294 B1 * | 6/2001 | Davis et al. | 210/785 |
| 6,365,054 B1 * | 4/2002 | Kruger et al. | 210/797 |
| 6,395,186 B1 * | 5/2002 | De Kock et al. | 210/748.05 |
| 6,409,929 B2 * | 6/2002 | Bott et al. | 210/770 |
| 6,439,273 B1 * | 8/2002 | Kruger et al. | 141/11 |
| 6,500,347 B2 * | 12/2002 | Ohkoshi et al. | 210/772 |
| 6,521,135 B1 * | 2/2003 | Benesi | 210/771 |
| 6,648,978 B2 * | 11/2003 | Liaw et al. | 127/67 |
| 6,680,032 B1 * | 1/2004 | Uhlemann et al. | 422/147 |
| 6,709,586 B2 * | 3/2004 | Mason | 210/237 |
| 6,787,046 B2 * | 9/2004 | De Kock et al. | 210/748.05 |
| 6,872,310 B2 * | 3/2005 | Trotzki et al. | 210/332 |
| 6,960,660 B2 * | 11/2005 | Niinobe et al. | 536/85 |
| 7,011,741 B2 * | 3/2006 | Benesi | 210/97 |
| 7,074,338 B2 * | 7/2006 | Mizuno | 210/777 |
| 7,241,383 B2 * | 7/2007 | Katano | 210/223 |
| 7,381,323 B2 * | 6/2008 | Umezawa et al. | 210/108 |
| 7,445,716 B2 * | 11/2008 | Quintel et al. | 210/636 |
| 7,465,398 B1 * | 12/2008 | Robert et al. | 210/651 |
| 7,722,767 B2 * | 5/2010 | Quintel et al. | 210/321.88 |
| 8,029,680 B2 * | 10/2011 | Shinoda et al. | 210/777 |
| 8,048,299 B2 * | 11/2011 | Quintel et al. | 210/232 |
| 8,101,090 B2 * | 1/2012 | Ralvert | 210/797 |
| 8,110,110 B2 * | 2/2012 | Croue et al. | 210/638 |
| 8,197,699 B2 * | 6/2012 | Kowollik et al. | 210/784 |
| 2001/0003330 A1 * | 6/2001 | Bott et al. | 210/771 |
| 2001/0013491 A1 * | 8/2001 | Kaske | 210/222 |
| 2003/0164342 A1 * | 9/2003 | Mason | 210/798 |
| 2004/0099613 A1 * | 5/2004 | Franke et al. | 210/772 |
| 2004/0168986 A1 * | 9/2004 | Katano | 210/695 |
| 2005/0145567 A1 * | 7/2005 | Quintel et al. | 210/636 |
| 2005/0189303 A1 * | 9/2005 | Kaeske | 210/774 |
| 2005/0284824 A1 * | 12/2005 | Anderson et al. | 210/768 |
| 2006/0122384 A1 * | 6/2006 | Hayakawa et al. | 536/85 |
| 2006/0266685 A1 * | 11/2006 | Umezawa et al. | 210/216 |
| 2006/0266686 A1 * | 11/2006 | Umezawa et al. | 210/216 |
| 2006/0266687 A1 * | 11/2006 | Umezawa et al. | 210/216 |
| 2007/0014905 A1 * | 1/2007 | Chen et al. | 426/490 |
| 2007/0210014 A1 * | 9/2007 | Kowollik et al. | 210/784 |
| 2008/0078726 A1 * | 4/2008 | Pancaldi et al. | 210/770 |
| 2008/0290029 A1 * | 11/2008 | Croue et al. | 210/638 |
| 2009/0050581 A1 * | 2/2009 | Kaske | 210/797 |
| 2009/0101601 A1 * | 4/2009 | Kaske | 210/798 |
| 2009/0218285 A1 * | 9/2009 | Hank | 210/650 |
| 2011/0031192 A1 * | 2/2011 | Wiley | 210/770 |
| 2011/0204001 A1 * | 8/2011 | Gaudfrin | 210/768 |

FOREIGN PATENT DOCUMENTS

| | | |
|---|---|---|
| EP | 0 155 347 A2 | 9/1985 |
| JP | 2011036855 A * | 2/2011 |
| WO | 01/56680 A1 | 8/2001 |

OTHER PUBLICATIONS

"The Candle Filter", Aug. 15, 2011, [online], [retrieved on Apr. 6, 2012] Retrieved from Engineering Aspects in Solid-Liquid Seperation by Josh Halberthal using Internet <URL:http://www.solidliquid-separation.com/pressurefilters/Candle/candle.htm>.

Schweitzer, PA, Handbook of Separation Techniques for Chemical Engineers, 3rd ed., McGraw-Hill, New York. pp. 4.20-4.29, 1997.

* cited by examiner

FILTRATION OF CORN STARCH FOLLOWED BY WASHING AND COLLECTION OF THE RESULTANT CORN STARCH CAKE

BACKGROUND OF THE INVENTION

This invention relates to a filter system to separate a solid phase from a liquid phase in a slurry.

SUMMARY OF THE INVENTION

In one embodiment, the present invention relates to a method of forming a filter cake from a slurry comprising the steps of: feeding the slurry into a filter housing, wherein the filter housing includes a plurality of vertical filter elements; pressing the slurry into the filter housing against the filter elements resulting in a i) a filtrate passing through the filter elements and exiting out an exhaust port of the filter housing; ii) forming a solid cake on the filter elements; feeding a wash liquid into the filter housing while draining out the slurry by opening the slurry drain valve; closing the slurry drain valve and then continually feeding wash liquid through the cake and into the filter tube of the filter housing; stopping the feed of wash liquid; introducing a gas into the filter housing and draining out the wash liquid by opening a bottom drain valve; stopping the gas flow and opening a drain to exit most of the gas and remaining wash liquid; opening the bottom cake discharge valve; and back pulsing by a gas to break and to release the filter cake from the filter elements of the filter housing.

In another embodiment, the present invention relates to a cake filtration device having a filter housing: wherein the filter housing having a top and bottom portion; wherein the filter housing includes a plurality of vertical filter elements; and wherein the bottom of the filter housing has a flange that contains a cake discharge valve that has an internal diameter which is at least 70% of an internal diameter of the filter housing.

In another embodiment, the present invention relates to a cake filtration device wherein the cake discharge valve has at least one drain port sufficiently designed to allow for substantial removal of liquid held within the discharge valve.

In another embodiment, the present invention relates to a cake filtration device having a filter housing: wherein the filter housing having a top and bottom portion; wherein the filter housing includes a plurality of vertical filter elements; wherein the top portion of the filter housing has at least one process connection for a wash liquid and the bottom portion of the filter housing has at least one process connection for a slurry drain.

In another embodiment, the present invention relates to a cake filtration device having a filter housing: wherein the filter housing having a top and bottom portion wherein the filter housing includes a plurality of vertical filter elements; wherein the bottom portion of the filter housing has at least one process connection for a wash liquid and the top portion of the filter housing has at least one process connection for a slurry drain.

In another embodiment, the present invention relates to a cake filtration device having a filter housing: wherein the filter housing having a top and bottom portion; wherein the filter housing includes a plurality of vertical filter elements; wherein the bottom of the filter housing has a flange that contains a cake discharge valve that has an internal diameter which is at least 70% of an internal diameter of the filter housing; and wherein the top portion of the filter housing has at least one process connection for a wash liquid and the bottom portion of the filter housing has at least one process connection for a slurry drain.

BRIEF DESCRIPTION OF THE SEVERAL VIEWS OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention.

DETAILED DESCRIPTION OF THE INVENTION

Figure 1:
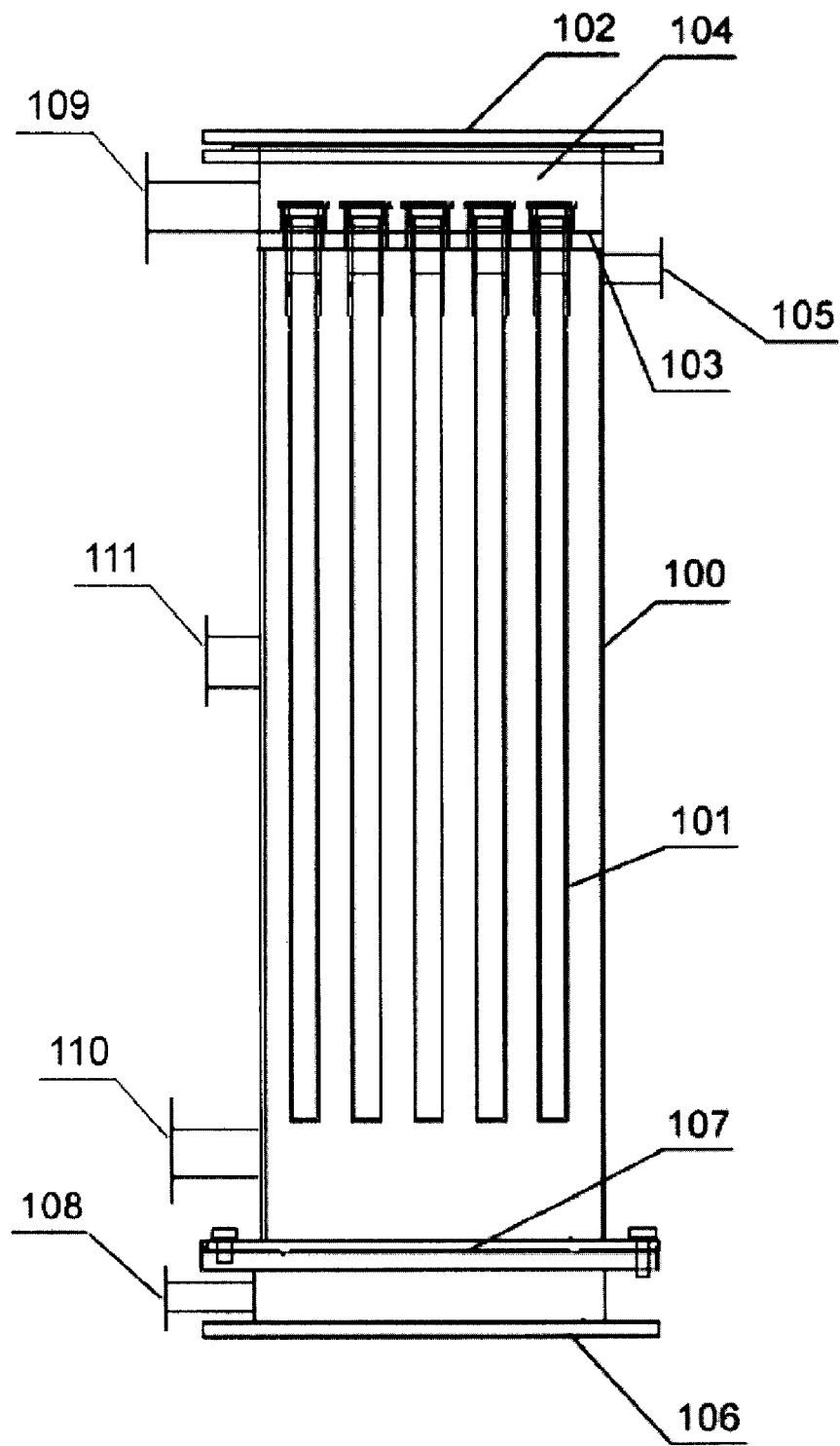
FIG. 1 illustrates a cross section of an embodiment of the filter system in accordance with the present invention.

Detailed embodiments of the present invention are disclosed herein; however, it is to be understood that the disclosed embodiments are merely illustrative of the invention that is embodied in various forms. In addition, each of the examples given in connection with the various embodiments of the invention is intended to be illustrative, and not restrictive. Further, the figures are not necessarily to scale, some features are exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

The present invention relates to a filter cake device having a filter housing. In one specific embodiment, the filter housing is a vertical round filter housing. Suitable examples of dimensions of filter housings include, but are not limited to, 6", 16", 24", or 26" diameter. In one embodiment, the filter housing contains at least one filter element. In an embodiment, the filter element has a tube shape. In another embodiment, the filter housings may contain a plurality of filter elements e.g. 3, 7, 15, or 19 elements, and a full system may contain several filter housings to achieve the desired solids rate. In an embodiment, the filter element is a tube shape. In one embodiment, the filter elements are made of porous stainless steel sintered metal. Suitable filter elements material include, but are not, limited to sintered metal, woven metal mesh, porous ceramic, porous polymer membranes, or woven polymer cloth. In one example, the sintered metal membrane elements have a porosity sized for the material being filtered to minimize solids loss and maximize flow through the membrane. Different products may require different filter porosity depending on particle size. In one specific example, the micron rating of the filter elements used to filter corn starch can be in the range of about 1-5 microns. Suitable porosity sizes include, but are not limited to, 0.5-micron to 20-micron.

In another embodiment, the filter elements are suspended vertically from the top. In another embodiment, the elements are suspended vertically from a fixed top flange or plate that allows flow from the center of the filter element through the plate and to a filtrate collection header. An example of the filter element is a filter tube that is about 50 mm outside diameter and 1500 mm length. Suitable filter tubes sizes include, but are not limited to, 25-75 mm outside diameter (OD) and 500-2000 mm long.

In yet another embodiment, this filtrate collection header has one or more process connections for back-pulse air, exhaust, and/or clean-in-place (CIP) fluid.

In another embodiment, the bottom of the filter housing has a flange that contains a valve that is substantially the same inside diameter (ID) as the filter housing. In one embodiment, the valve comprises a means that allows for draining at least some of a liquid from the housing prior to opening the valve. For example, the valve housing may contain one or more outlets to accommodate controlled drainage flow rates. Suitable valves include, but are not limited to, a slide gate valve with flush/drain ports and a high performance butterfly valve with drain ports in the housing. In another embodiment, the bottom of the housing includes connections for slurry, wash liquid, and/or draining. In one embodiment, the bottom drain ports combine into a header. In one embodiment, the bottom drain header has a slurry drain process connection and a water drain process connection.

In yet another embodiment, the housing includes one or more process connections for slurry, air, wash liquid, drain, and/or CIP fluid. The top of the housing may include a connection for drying air process, wash liquid, and/or slurry feed. In another embodiment, the process connections may have one or more common manifolds external to the housing. On one example, the metal membranes may foul over time, so in one embodiment, a cleaning system is provided to regenerate the membranes. For corn starch filtration, one example includes a hot, dilute caustic solution to remove the membrane fouling.

The cake filtration device of the present invention is used in conjunction with a slurry. For purposes of the present invention, a slurry is a liquid containing suspended solids. Examples of suitable slurries include, but are not limited to, starch in water. In one embodiment, the slurry concentrations range from about 5% to about 40% solids, more particularly, about 10% to about 30%. The method of the present invention results is a "filter cake" having a thickness that can vary from about 1/8" to over 2". The thickness of the filter cake can vary depending on variables such as, e.g., the product being filtered, the pressure used during slurry feed, and the time during the slurry feed phase. The maximum cake thickness is determined by the distance between filter elements, filter tubes, and/or the distance between the filter element and the housing wall.

The following is an illustrative example of one embodiment of a method of operating the cake forming filtration device. First, slurry is fed into the filter housing through the slurry process connection. Based on the pumping capacity, the pressure inside the filter housing increases and thus, causes liquid to be squeezed through the filter element, for example the filter tube, into the filtrate housing and out the exhaust port. Suitable pressures include, but are not, limited to 30-150 psi. As liquid is pushed through the filter, solids are left behind to form a "filter cake" around the filter tube.

Once filtration is deemed complete and thus the slurry flow is stopped, air may be introduced into the filter housing through an air process connection to drain the slurry out of the filter housing either by way of the slurry process connection or through the drain ports. In one embodiment, at least one drain port is located at the bottom of the filter hosing.

Wash liquid (e.g. water, acetone, ethanol) can then be fed into the filter housing through the wash liquid process connection. In one embodiment, the wash water inlet is located at the top of the filter housing. The wash liquid is pushed through the cake built up on the filter tubes, displacing the liquid still around the cake into the filtrate collection header. The wash liquid is sent out the exhaust port.

Once washing is complete, the air drying is performed. Air may again be introduced into the housing through the air process connection to either push the wash liquid through the cake and/or push the wash liquid out of the housing through the drain port. Air continues to be fed into the filter housing through the air process connection. The air displaces some of the liquid surrounding and within the cake, reducing the cake moisture. Air and liquid are pushed through the filter tubes, into the filtrate collection header, and out the exhaust port. The drain valve is open part of the time to remove all liquid from the housing.

When air drying is considered completed (e.g., the desired cake moisture has been achieved), the air valve and exhaust port are closed. Once the housing pressure has been reduced to only slightly above ambient (e.g. less than 5 psi), the bottom cake discharge valve is opened (e.g. a valve that is substantially the same ID as the filter housing; please consider in view of FIG. 1 in which the discharge valve looks bigger than the housing) and air is introduced into the filtrate header from the back-pulse air connection. Consequently, the cake is dislodged from the filter tubes, falls through the bottom valve, and the cake is recovered.

FIG. 1 illustrates a cross section of an embodiment of the filter system in accordance with the present invention. Specifically, FIG. 1 shows the embodiment having a housing 100 which holds one or more filter elements 101. In an embodiment, the filter elements 101 are vertically suspended from a header plate 103. In an embodiment, the filter element 101 is made from a porous sintered metal material. In an embodiment, the header plate 103 allows a flow from a center of the filter element 101 to a filtrate collection header 104. In an embodiment, the filtrate collection header 104 has at least one process connection 109 for back-pulse air, clean-in-place fluid, and/or filtrate exhaust. These ports may be separate or part of an external manifold. In an embodiment, top flange 102 seals the filtrate collection and allows access to the filter elements.

In an embodiment, the housing 100 is connected to a bottom flange 107. In an embodiment, the bottom flange 107 includes a cake discharge valve 106. In an embodiment, the housing 100 is a round housing, and a part of the cake discharge valve 106 that opens to the insides of the housing 100 has the same or substantially the same inside diameter as the internal diameter of the housing 100 In an embodiment, a part of the cake discharge valve 106 that opens to the insides of the housing 100 has a diameter which is at least 70% of an internal diameter of the housing 100. In an embodiment, the cake discharge valve 106 has one or more drain ports 108 drilled into the side of the valve housing to drain substantially all liquid from the housing 100 before the valve 106 is opened. In an embodiment, the valve 106 is a slide gate valve with flush/drain ports. In an embodiment, the valve 106 is a high performance butterfly valve with added drain ports.

In an embodiment, the housing 100 further has at least one or more process connections 105 to deliver a feed, for example slurry, air, wash fluid, and clean-in-place fluid and/or to drain the housing 100. In an embodiment, the housing 100 further has at least one or more process connections 110 to deliver a feed, for example slurry, wash fluid, and clean-in-place fluid, and/or to drain the housing 100. In an embodiment, process connections 105, 108, 110 are connected to an external manifold. In an embodiment, housing 100 has additional wall penetrations 111, for example, pressure gauges, level detectors, and/or sightglasses.

Figure 2:
FIG. 2 shows a vertical cross section through a component of the filter system in accordance with the present invention.
Figure 3:
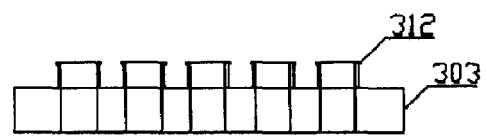
FIG. 3 shows a horizontal cross section through a component of the filter system in accordance with the present invention.

FIG. 2 shows a vertical cross section through a filter element 200 used in the present invention. In an embodiment, a ferrule 201 is part of the top part of the filter element. FIG. 3 shows a cross section of an embodiment of a top plate 303 that separates a housing and a filtrate collection header. The top plate 303 includes holes to pass through portions of filter elements suspended in the housing. In an embodiment, the portions of the filter elements which are above the top plate are substantially designed to allow the filter elements to hang from the top plate within the body of the housing. In an embodiment, the ferrules 312 are attached to the top plate and clamp to the top portions of the filter elements. In an embodiment, the ferrules 312 are welded to the corresponding holes on the top plate.

Figure 4:
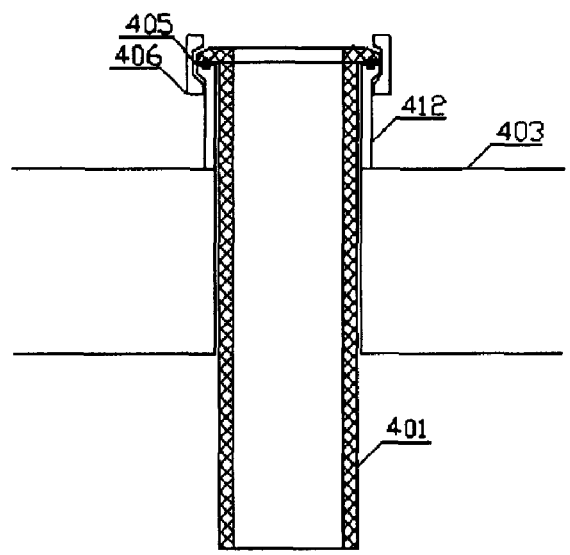
FIG. 4 shows a cross section of an embodiment of components of the filter system in accordance with the present invention.

FIG. 4 shows an expanded view of how FIG. 2 and FIG. 3 can be combined. The filter element 401 is inserted through top plate 403 and ferrule 412. Clamp 406 and gasket 405 are used to seal the filter element 401 to ferrule 412.

Figure 5:
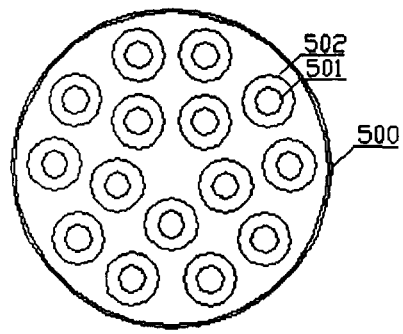
FIG. 5 shows a top view of an embodiment of a component of the filter system during practicing the present invention.

FIG. 5 shows a horizontal cross section through an embodiment of a housing 500 during practice of the present invention. FIG. 5 shows filter elements 501 surrounded with a filtrand 502, a residue remaining in the housing 500 following removal of a filtrate in accordance with the present invention. For example, in an embodiment the filtrand 502 is a filter cake formed when a liquid portion of slurry, the filtrate, is removed from slurry in accordance with the present invention.

Figure 6:
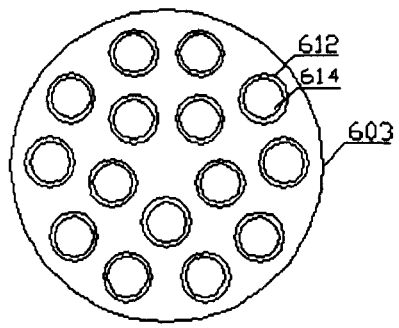
FIG. 6 shows a top view of an embodiment of a component of the filter system in accordance with the present invention.

FIG. 6 shows a top view of an embodiment of a top plate 603 of the filter system in accordance with the present invention. In an embodiment, the top plate 603 contains holes 614 designed to allow portions of filter elements to pass through the top plate 603. In an embodiment, ferrules 612 are attached to the top plate 603 and clamp the top portions of the filter elements.

Figure 7:
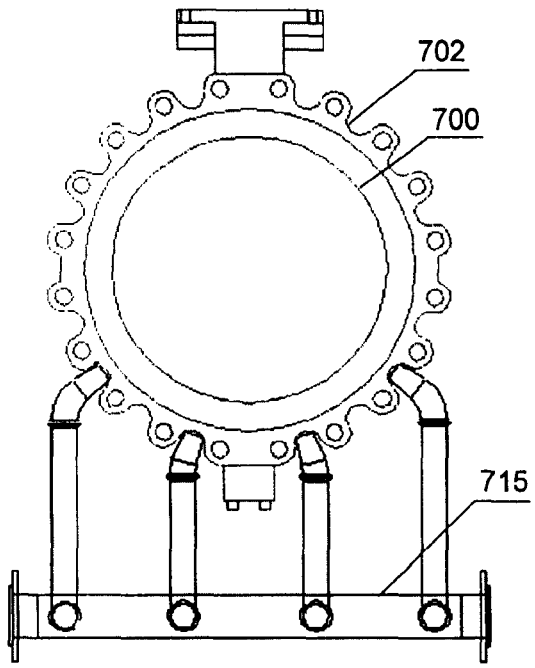
FIG. 7 shows a cross section of a portion of an embodiment of the filter system in accordance with the present invention.

FIG. 7 shows a cross section of a portion of an embodiment of the filter system in accordance with the present invention. In an embodiment, bottom cake discharge valve 702 is a high performance butterfly valve. In an embodiment, discharge valve 702 is flanged and bolted to the bottom of the housing. In an embodiment, butterfly valve wafer 700 provides the opening to discharge cake from the invention. In an embodiment, there are 4 drain ports drilled into the housing of cake discharge valve 702. In an embodiment, the 4 drain ports connect to a header 715.

Figure 8:
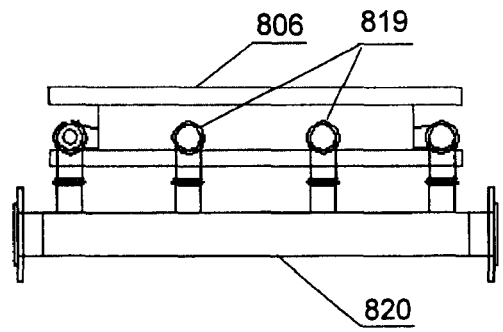
FIG. 8 shows a cross section of a bottom portion of an embodiment of the filter system in accordance with the present invention.

FIG. 8 shows a cross section of a bottom portion of an embodiment of the filter system in accordance with the present invention. In an embodiment, the bottom portion of the filter system includes a high performance butterfly valve 806, connected to the bottom of a housing. In an embodiment, the high performance butterfly valve 806 has at least one or more drain ports 819 to drain the filter system. In an embodiment, the drain ports 819 are gathered into a common manifold, a drain header 820.

Figure 9A:
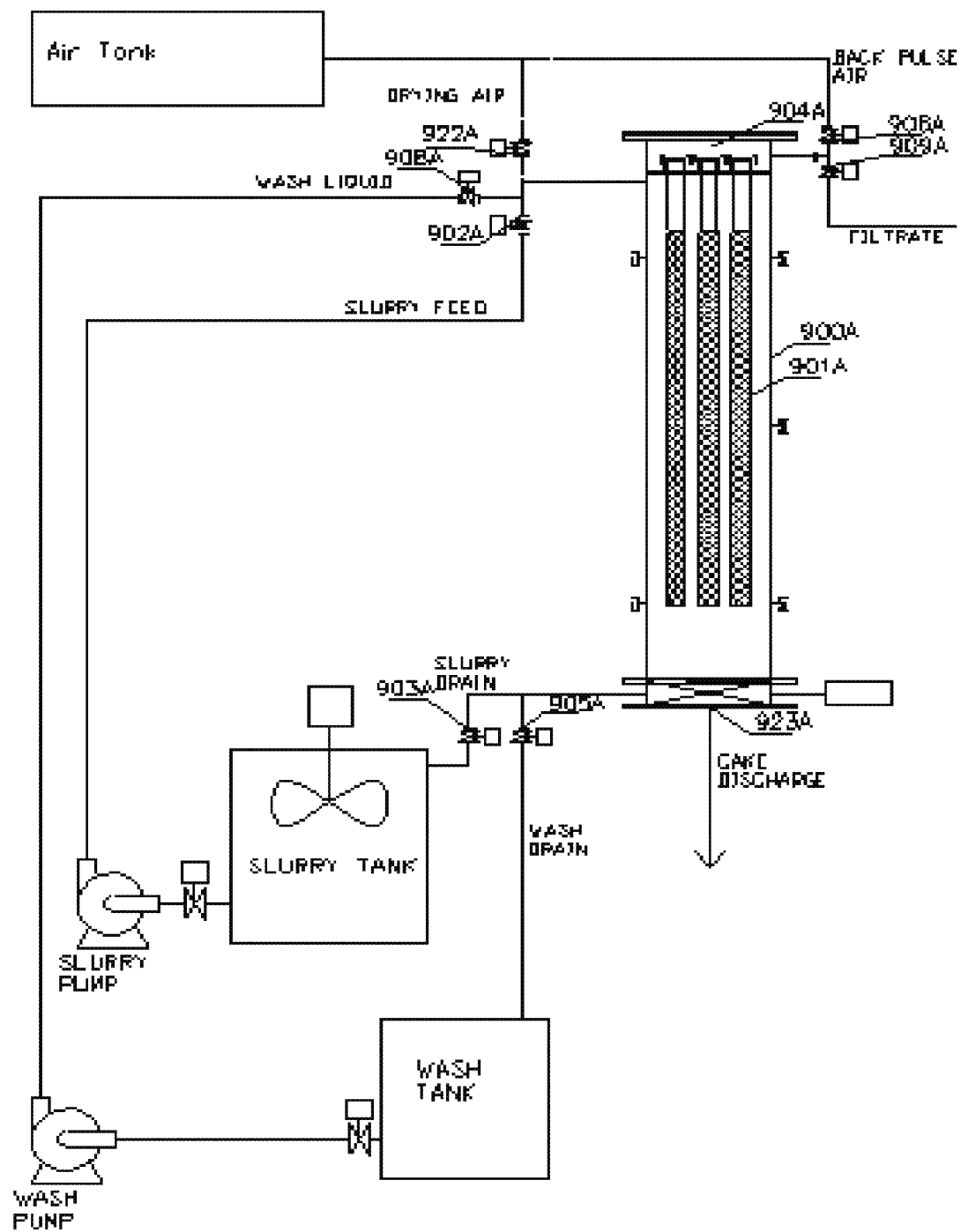
FIGS. 9A and 9B illustrate flow charts of embodiments of a process utilizing the filter system in accordance with the present invention.
Figure 9B:
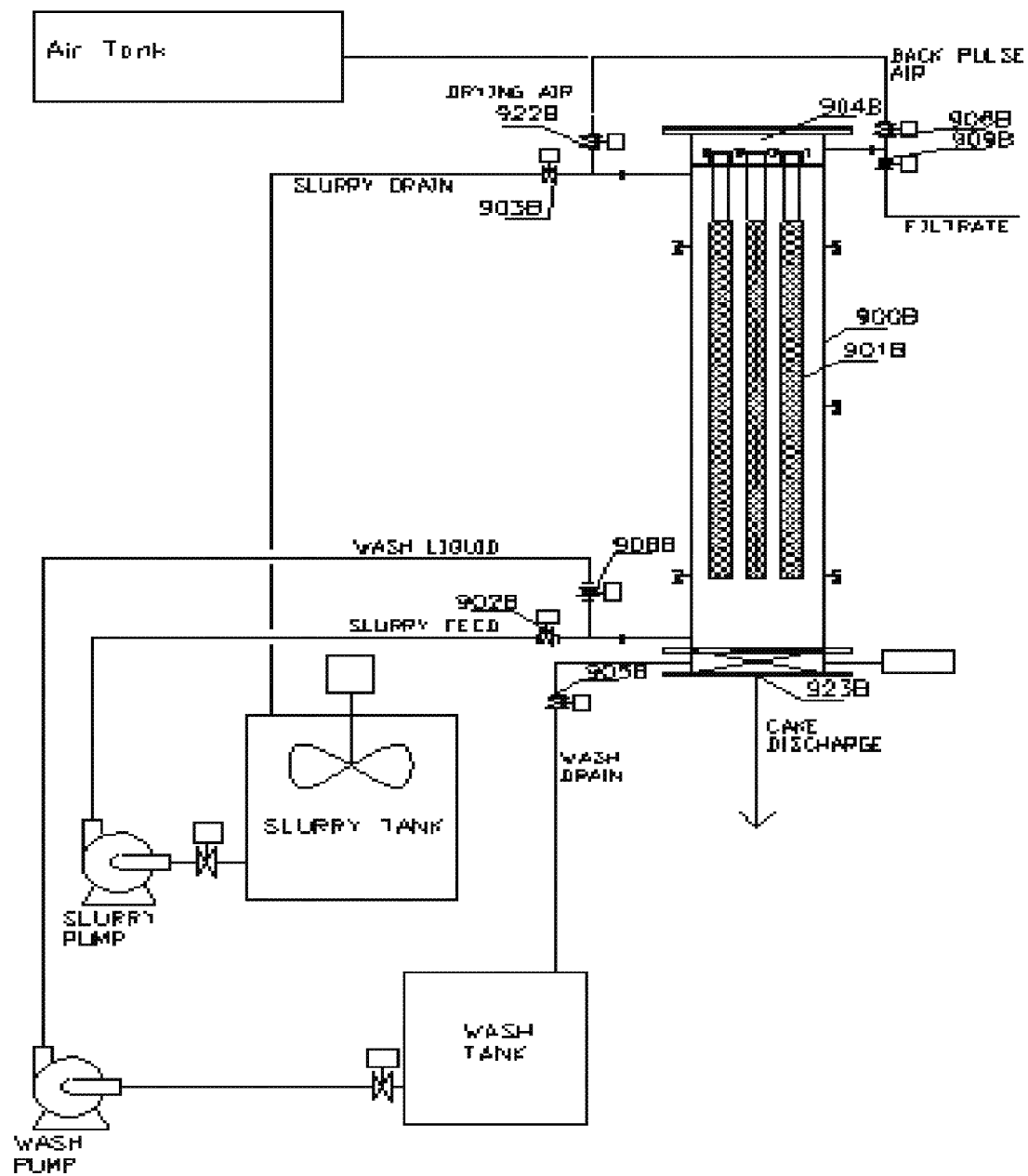

FIGS. 9A and 9B illustrate flow charts of embodiments of processes utilizing the filter system in accordance with the present invention. In an embodiment, slurry, a liquid containing suspended solids, is fed into a housing 900 of the filter system through the slurry process connection 902. In an embodiment, the pressure inside the housing 900 causes the liquid portion of the slurry to be squeezed through filter elements 901 into a filtrate header 904 and out of the exhaust port 909. In an embodiment, as the liquid portion is squeezed through the filter system, a filtrand, e.g. solids, are left behind to form a filter cake around the filter elements 901. In an embodiment, once filtration is deemed complete, air is introduced in to the housing 900 through an air process connection 922 to push the slurry out of the housing 900 back through the slurry drain connection 903. FIGS. 9A and 9B illustrate two embodiments. FIG. 9A has slurry/water being fed from the top and all draining out the bottom. FIG. 9B has slurry/water being fed from the bottom, slurry draining from top, and water draining out bottom.

In an embodiment, a wash liquid, typically water, is fed into the housing 900 through a wash liquid process connection 908. In an embodiment, the wash liquid is pushed through the cake built up on the filter elements 901, displacing the liquid portion still around the cake into the filtrate collection header 904 and into the exhaust port 909. In an embodiment, once washing is complete, air is introduced in to the housing 900 through an air process connection 922 to either push the wash liquid through the filter cake or push the wash liquid out of the housing 900 through the wash drain connection 905.

In an embodiment, air continues to be fed into the housing 900 through the air process connection 922. In an embodiment, the air displaces some of the liquid surrounding and/or within the filter cake, reducing the cake's moisture. In an embodiment, air and liquid are pushed through the filter elements 901 into the filtrate header 904 and out the exhaust port 909. In an embodiment, a wash liquid drain valve 905 is opened part of the time to remove all liquid from the housing 900.

In an embodiment, when air drying is completed, an air valve 922 is closed. In an embodiment, once a pressure in the housing 900 is reduced to less than 5 psig, the exhaust port 909 is closed and the cake discharge valve 923 is opened. In an embodiment, air is introduced into the filtrate header 904 from a back-pulse air connection 906. In an embodiment, the filter cake is dislodged from the filter elements 901, falls through the slide gate 923, and leaves the filter system.

Figure 10:
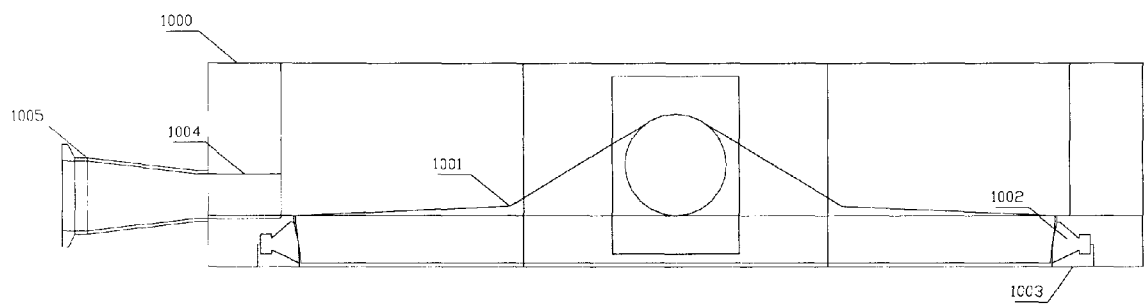
FIG. 10 illustrates a cross section of an embodiment of the filter system in accordance with the present invention.

FIG. 10 illustrates the cross section of a modified high performance butterfly valve in accordance with the current invention. In an embodiment, the valve body 1000 is placed with the main disc 1001 as the lowest part of the valve. In a typical high performance ball valve, the seat ring 1002 is fitted into the housing 1000 and held in place by seat retainer 1003. In an embodiment, one or more holes 1004 are drilled into the housing at or slightly below the level of the main disc 1001. In an embodiment, connection piping 1005 is welded to the valve housing 1000.

In embodiments, the housing of the filter system is assembled from a broad range of materials from piping to custom fabricated material. In embodiments, all process connections to the housing have valves. In embodiments, the use of the back-pulse of air allows for a gravity discharge.

The present invention can be used for various applications where a solid needs to be separated from a liquid portion of slurries into a cake. For example, in an embodiment, the filter system is used to dewater and wash filter corn starch slurries to produce a starch cake. For example, corn starch slurry has a nominal particle size of 8-10 microns. In an embodiment for the corn starch that has solids of this size, the filter element with a porosity of 5 microns allows less than 100 ppm start solids into the filtrate.

What is claimed is:

1. A method of dewatering and washing a corn starch and water slurry to form a filter cake from said corn starch and water slurry, said method comprising the steps of:
   feeding, under pressure, said corn starch and water slurry into a filter housing, wherein said filter housing is of uniform cross-sectional area and includes a plurality of vertical filter elements;
   passing said water through said vertical filter elements as filtrate;
   forming a cake of corn starch on said vertical filter elements;
   ceasing said slurry feeding;
   allowing any remaining slurry and/or filtrate in said filter housing to drain;
   feeding a wash liquid into the filter housing such that it flows through the cake and into a filtrate space of said vertical filter elements, displacing any liquid in or around said cake into a filtrate collection header of said filter housing;
   ceasing said wash liquid feeding;
   draining the wash liquid through an exhaust port of said filter housing;
   introducing a gas flow into said filter housing to dry said cake by forcing any remaining wash liquid out of said cake;
   ceasing said gas flow and opening a drain to allow most of the gas and any remaining wash liquid to exit;
   opening a cake discharge valve located at the bottom of said filter housing, said cake discharge valve defining an opening having a cross-sectional area that is substantially equal to the cross-sectional area of said filter housing;
   backpulsing a gas out through said filter elements in a direction opposite to a filtration direction to break and release the filter cake from said filter elements of said filter housing; and
   allowing released cake to exit through said opening in said discharge valve.

2. The method of dewatering and washing a corn starch and water slurry of claim 1 wherein said wash liquid is selected from the group consisting of water, acetone and ethanol.

3. The method of dewatering and washing a corn starch and water slurry of claim 1 wherein said cake discharge valve is a butterfly valve.

4. The method of dewatering and washing a corn starch and water slurry of claim 1 wherein said cake discharge valve is a gate valve.

5. The method of dewatering and washing a corn starch and water slurry of claim 1 wherein said step of draining the wash liquid through an exhaust port of said filter housing is accomplished by introducing air into the filter housing through an air process connection to drain the slurry out of the filter housing either by way of a slurry process connection or through drain ports.

* * * * *